UNITED STATES PATENT OFFICE.

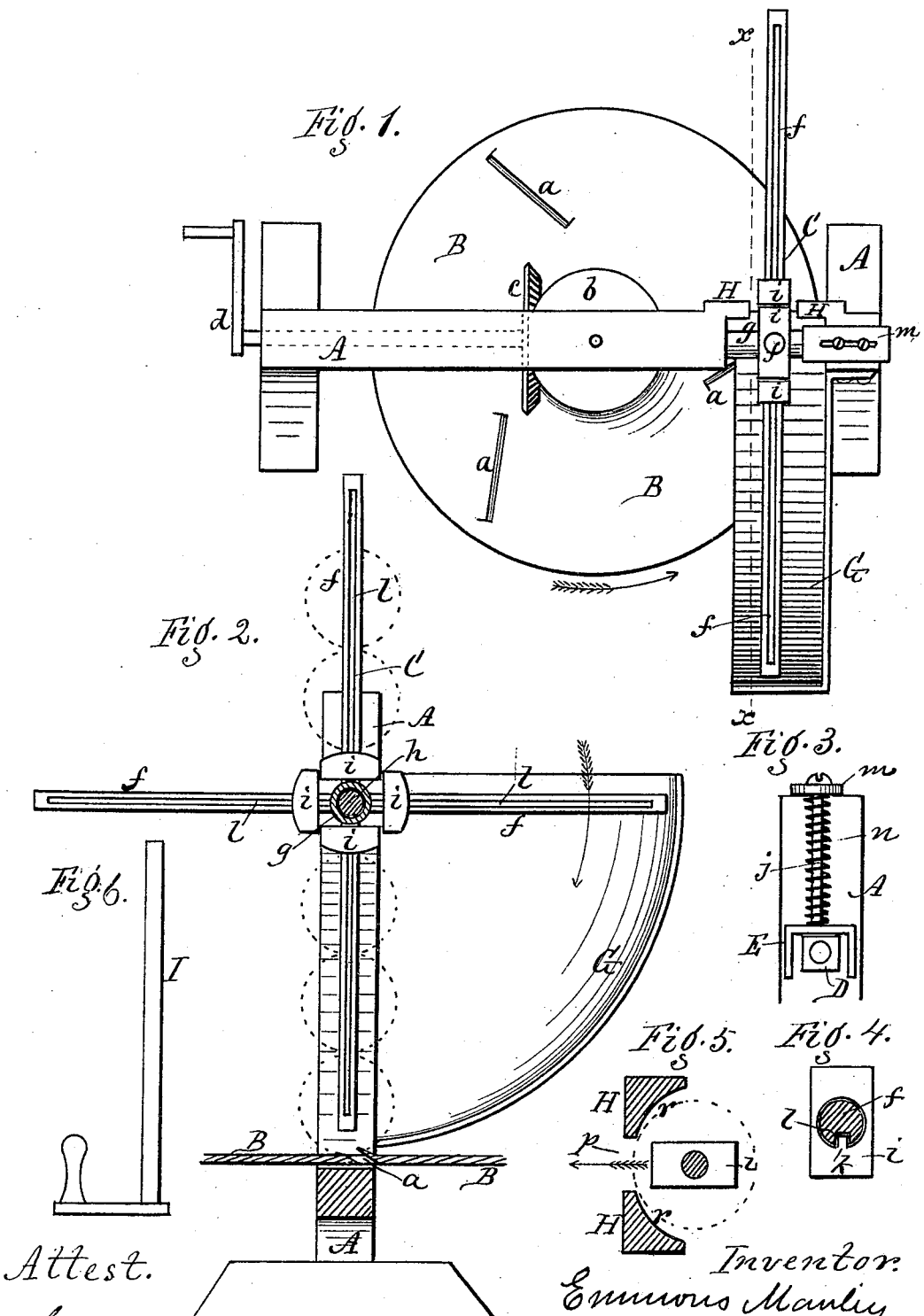

EMMONS MANLEY, OF MARION, NEW YORK.

FRUIT AND VEGETABLE SLICER.

SPECIFICATION forming part of Letters Patent No. 241,040, dated May 3, 1881.

Application filed November 8, 1880. (Model.)

*To all whom it may concern:*

Be it known that I, EMMONS MANLEY, of Marion, Wayne county, New York, have invented a certain new and useful Improvement in Machines for Slicing Fruits and Vegetables; and I do hereby declare that the following is a full, clear, and exact description of the same, reference being had to the accompanying drawings, in which—

Figure 1 is a plan of the machine. Fig. 2 is a cross-section in line $x\ x$, looking in the direction of the arrow, Fig. 1. Figs. 3, 4, 5, and 6 are detail views.

This machine is adapted to slicing both fruits and vegetables, but is particularly applicable to those fruits which are first pared and cored, and are then to be cut into thin slices at right angles to the core-passage.

The invention relates to certain parts for feeding the fruit to the knives, as hereinafter more fully described.

In the drawings, A represents a frame, which may be of any suitable construction.

B is a circular disk, having knives $a\ a$ at suitable distance apart. This cutter is mounted on a vertical shaft, and is driven by two bevel-gears, $b\ c$, and a crank, $d$.

Instead of a circular cutter a reciprocating or other cutter may be used, if desired.

C is a reel consisting of a series of radial arms, $f f f f$, attached to a hollow hub, $g$, which turns freely on a short axle or journal, $h$. Any desired number of these arms may be used.

$i\ i$ are small weights, forming followers, which slide forward and back on the arms, being retained in position by tongues $k\ k$, Fig. 4, which slide in longitudinal slots $l\ l$ of the arms. The weights are rectangular in outline, and the connection above described keeps them pointed in proper position for passing through the slot in the standards, hereinafter described.

If desired, the ribs may be formed on the arms and the slots be formed in the weights, or other means may be used to connect the weights with the arms.

D, Fig. 3, is a square knuckle or block formed on one end of the hollow hub or shaft $g$.

E is a square loop or strap fitting on top of the knuckle, the loop having a stiff arm, $j$, which projects upward through an adjustable plate, $m$, secured on top of the frame A. A spiral spring, $n$, rests between the plate $m$ and the top of the loop E, and bears the latter down upon the knuckle. The action is similar to the spring in a jack-knife, and the reel at every quarter-turn will be held stationary for the fruit on the lower arm to be sliced.

G is a segmental rim, forming a way extending a quarter of a circle, more or less, and serving to retain the fruit upon the arms as they go down to the knives.

H H are two standards just forward of the lower vertical arm of the reel, and having a slot, $p$, Fig. 5, through which the arms and their weights pass. The inner sides of the standards are concaved, as shown at $r\ r$, conforming to the shape of the fruit, and they form shoulders or stops to the fruit while being sliced.

The operation is as follows: The apples or other fruit, having been previously pared and cored, are placed, one after another, upon the upper vertical arm of the reel with the weight $i$ resting beneath them at the bottom of the arm. When the arm is full the reel is turned till the next arm comes in place, and that is also filled. The first arm, when it reaches a horizontal position, passes within the segmental rim G, which keeps the apples in place on the arm as it passes downward. When the apples reach the bottom the knife commences to slice, and the weight $i$, then being uppermost, acts as a follower to constantly feed the apples down till they are all sliced.

By the means above described the apples may be fed automatically to the cutter without stopping the regular action of the machine, and the work can be done without breakage or injury of the tenderest fruit.

The concave standards H H hold the apples in position against the cutting action of the knives, and the vertical slot between the standards allows the passage of the arms of the reel and their weights. The knuckle D and spring-loop E are essential to gage the arms centrally over the cutter, so that the fruit shall come in proper position for cutting; also, to hold the arms at such a distance from the standards H H as to allow the apples to feed down freely and without clogging, and, furthermore, to allow a certain degree of vibration or swinging movement to the arms, so that as the cutter acts against the fruit the latter will be pressed up against the standards, and when the cutting-pressure is removed the arm shall move back again to allow the apple to fall for a new cut. For this purpose it is essential that the spring action shall be slight and sensitive.

The apples may be placed upon the arms by hand one after another, or they may be strung upon the separate handled holder I, which is then inverted above the arm, and the apples will pass from one to the other. This holder is shown in Fig. 6.

The reel might be used without the weights i i, but it is desirable to use the latter to insure proper feeding of the apples downward.

Having thus described my invention, what I claim as new, and desire to secure by Letters Patent, is—

1. In a machine for slicing fruits and vegetables, the revolving reel C, provided with straight radial arms f f, and a rotary, reciprocating, or other cutter beneath the reel, as herein set forth.

2. In a machine for slicing fruits and vegetables, the combination, with the reel C, provided with arms f f, of weights i i, resting on the arms beneath or behind the articles to be sliced, and serving to press the articles down to the cutter by sliding on the arms when standing downward, as herein shown and described.

3. In a machine for slicing fruits and vegetables, the combination, with the reel C, provided with arms f f, of the segmental rim G on one side of the reel, for the purpose of holding the articles to be sliced upon the arms while passing downward to the cutter, as herein shown and described.

4. In a machine for slicing fruits and vegetables, the combination, with the reel C, of the square knuckle D formed on its shaft, the square loop or strap E, resting over the knuckle, the arm or rod j, attached to the loop, and the spring n, for pressing the loop down upon the knuckle, as shown and described, and for the purpose specified.

5. In a machine for slicing fruits and vegetables, the combination, with the reel C, of the standards H H, with a slot, p, between them for the passage of the arms of the reel, said standards being concave on their inner sides, to fit the article which is being sliced, and serving as stops to the article against the action of the cutter, as herein shown and described.

In witness whereof I have hereunto signed my name in the presence of two subscribing witnesses.

EMMONS MANLEY.

Witnesses:
RALPH D. CHAPMAN,
WILLIAM JENKINS.